US006792859B2

United States Patent
Fukui et al.

(10) Patent No.: US 6,792,859 B2
(45) Date of Patent: Sep. 21, 2004

(54) ROTATING DRUM AND IMAGE RECORDING DEVICE

(75) Inventors: Takashi Fukui, Kanagawa (JP);
Akihiro Hashiguchi, Kanagawa (JP);
Mitsuhiro Kitano, Tochigi-ken (JP);
Tugio Fukasawa, Tochigi-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/373,724

(22) Filed: Feb. 27, 2003

(65) Prior Publication Data
US 2003/0172829 A1 Sep. 18, 2003

Related U.S. Application Data
(60) Provisional application No. 60/413,754, filed on Sep. 27, 2002.

(30) Foreign Application Priority Data
Mar. 5, 2002 (JP) ........................................ 2002-058406

(51) Int. Cl.$^7$ ............................. B41F 13/08; H04N 1/06
(52) U.S. Cl. .................... 101/378; 101/409; 101/415.1; 492/38
(58) Field of Search ................................ 101/212, 216, 101/375, 376, 378, 401.1, 407.1, 409, 415.1; 29/895, 895.2; 492/38

(56) References Cited

U.S. PATENT DOCUMENTS

| | | | | |
|---|---|---|---|---|
| 180,169 A | * | 7/1876 | Tasker | 279/2.13 |
| 901,873 A | * | 10/1908 | Brubaker | 492/38 |
| 1,209,736 A | * | 12/1916 | Lueckenbach | 492/38 |
| 5,224,252 A | * | 7/1993 | Baker et al. | 492/38 |
| 5,253,816 A | * | 10/1993 | Kastingschafer et al. | 241/227 |
| 5,758,242 A | * | 5/1998 | Malespin et al. | 399/277 |
| 6,164,204 A | * | 12/2000 | Kawada et al. | 101/415.1 |
| 6,546,867 B1 | * | 4/2003 | Franklin et al. | 101/378 |

* cited by examiner

Primary Examiner—Leslie J. Evanisko
(74) Attorney, Agent, or Firm—Taiyo, Nakajima & Kato

(57) ABSTRACT

A rotating drum in which, when the rotating drum is rotated at high speed, there is no offset between divisional drum parts, there is little imbalance, and a moment of inertia for rotation is small. A drum main body is divided into four drum parts whose cross-sectional configurations orthogonal to an axis are fan-shaped. Female projecting portions and male projecting portions are formed at a pitch dimension having a predetermined fit-together tolerance. Thus, the drum parts can be assembled together with a certain amount of leeway at a time of assembly. After the four drum parts have been assembled together, wires are press-fit in from an end surface side of the drum main body so as to tightly fasten the drum parts. Because the assembled drum main body defines configurations of the drum parts to have point symmetry, imbalance can be made small.

26 Claims, 8 Drawing Sheets

ROTATING DRUM AND IMAGE RECORDING DEVICE

This application claims priority under 35 U.S.C. 119(e) to provisional application No. 60/413,754 filed Sep. 27, 2002.

BACKGROUND OF THE INVENTION

1. Field of the Invention

The present invention relates to a rotating drum on whose peripheral surface a sheet material is wound such that the rotating drum supports the sheet material, and which can rotate in this state of supporting the sheet material. The present invention further relates to an image recording device using this rotating drum.

2. Description of the Related Art

Techniques (printing plate exposure devices) have been developed which, by using a sheet material, and in particular, a printing plate at which a photosensitive layer is provided on a support, record an image directly onto the photosensitive surface (emulsion surface) of the printing plate by a laser beam or the like. With such techniques, images can rapidly be recorded on printing plates.

In an automatic printing plate exposure device using a technique of recording an image on a printing plate, a printing plate is fed into an exposure section. The printing plate is thereby received at the exposure section, is positioned at a predetermined position, and is subjected to exposure processing.

Here, there is a method in which, in the exposure section, the printing plate is placed on a surface plate which supports the printing plate on a planar surface, and a recording head is moved relatively to the printing plate in the X-Y direction so as to carry out main scanning and subscanning to record an image. Further, there is a method in which the printing plate is trained on a rotating drum, and while the rotating drum is rotated at high speed (this is the main scanning), a recording head is moved along the axial direction of the rotating drum (this is the subscanning), so as to record an image on the printing plate.

In particular, in the method utilizing the rotating drum, high speed processing is possible because the rotating speed of the rotating drum is the speed of the main scanning. This method is also advantageous from the standpoint that the working space of the exposure section can be made to be more compact.

Because the rotating drum is rotated at high speed as described above, it is preferable that the rotating drum be formed of metal which has excellent durability. Further, while the rotating drum is rotating, the rigidity of the rotating drum must be ensured to the extent that it is difficult for the shaft to shake and the like.

Conventionally, the rotating drum is manufactured of an extruded material. However, in order to manufacture a large-diameter rotating drum without utilizing an extrusion molding device using a high pressure, for example, Japanese Patent Application Laid-Open (JP-A) No. 2001-033977 (which will hereinafter be referred to as the "prior art document") proposes a structure in which a rotating drum is divided by a plane passing through the substantial center of the circle of the rotating drum.

However, in the aforementioned prior art document, the plane of division is intended to be planar. It is easy for offset to arise between the adjacent divisional drums due to centrifugal force during rotation. Further, when the rotating drum rotates at high speed, a good image cannot be obtained at the regions of connection between the divisional drums.

Further, because the divisional drums are disposed so as to have line symmetry, there is much imbalance. A large deadweight is needed in order to achieve a balance, and the moment of inertia for rotation is large.

For these reasons, in the structure of the prior art document, it is extremely difficult to record an image by rotating a rotating drum at high speed.

Moreover, in the prior art document, fixing jigs are provided in the direction orthogonal to the axis of rotation, at the portions where the divisional drums are joined. Thus, assembling of the fixing jigs at the central portion in the axial direction of the drum cannot be carried out by using a regular tool, and complex work utilizing a special tool is required.

SUMMARY OF THE INVENTION

In view of the aforementioned, an object of the present invention is to provide a rotating drum and an image recording device in which, when the rotating drum is rotated at high speed, there is no offset between divisional drum parts, and there is little imbalance, and the moment of inertia for rotation is small.

Moreover, in addition to the above object, another object of the present invention is to provide a rotating drum which has a diameter which is larger than the maximum diameter of dies of an extrusion molding device used when the rotating drum is manufactured.

In order to achieve the above-described objects, in accordance with a first aspect of the present invention, there is provided a drum rotatable around a drum axis, and having a drum main body on whose outer peripheral surface a sheet is wound and held, the drum comprising: (a) a plurality of drum parts which are structured as if the drum main body is divided into plural parts in a peripheral direction, and which form the drum main body by being assembled together, and which can be separated from one another; and (b) joining elements which, at a time of assembling said drum, are positioned at borders of the drum parts which are adjacent, and which respectively extend parallel to the drum axis, and which are for joining the drum parts such that the drum parts can be separated from one another.

In accordance with another aspect of the present invention, there is provided an image recording device for forming an image on a printing plate, the image recording device comprising: (I) a drum rotatable around a drum axis, and having a drum main body on whose outer peripheral surface a printing plate is wound and held, the drum having: (a) a plurality of drum parts which are structured as if the drum main body is divided into plural parts in a peripheral direction, and which form the drum main body by being assembled together, and which can be separated from one another; and (b) joining elements which, at a time of assembling the drum, are positioned at borders of the drum parts which are adjacent, and which respectively extend parallel to the drum axis, and which are for joining the drum parts such that the drum parts can be separated from one another; and (II) a recording head portion disposed so as to oppose an outer peripheral surface of the drum, and having a recording head for recording an image on the printing plate.

BRIEF DESCRIPTION OF THE DRAWINGS

FIG. 5A is a state in which first through third drum parts are being assembled, and FIG. 5B is a state in which a fourth (and final) drum part is being assembled.

DETAILED DESCRIPTION OF THE PREFERRED EMBODIMENTS

Figure 1:
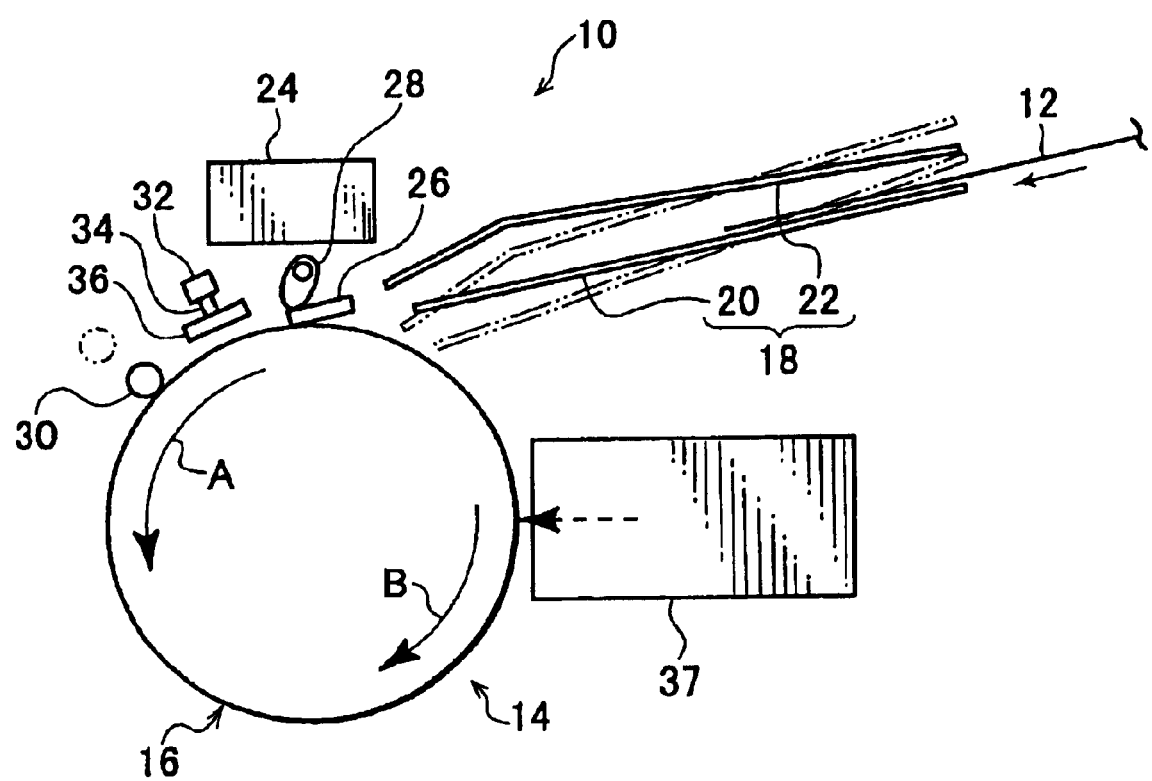
FIG. 1 is a schematic diagram of an automatic printing plate exposure device relating to an embodiment.

An automatic printing plate exposure device 10 relating to the embodiments of the present invention is shown in FIG. 1.

The automatic printing plate exposure device 10 is divided into two main sections which are an exposure section 14, which irradiates a light beam onto an image forming layer of a printing plate 12 so as to expose an image, and a conveying guide unit 18 which conveys the printing plate 12 to the exposure section 14. The printing plate 12, which has been subjected to exposure processing by the automatic printing plate exposure device 10, is fed out to a developing device (not illustrated) which is disposed adjacent to the automatic printing plate exposure device 10.

The exposure section 14 is structured such that a rotating drum 16, around whose peripheral surface the printing plate 12 is trained and held, is the main portion of the exposure section 14. The printing plate 12 is guided by the conveying guide unit 18, and is fed into the exposure section 14 from a direction tangential to the rotating drum 16. The conveying guide unit 18 is structured by a plate supplying guide 20 and a plate discharging guide 22.

The relative positional relationship of the plate supplying guide 20 and the plate discharging guide 22 of the conveying guide unit 18 is such that the plate supplying guide 20 and the plate discharging guide 22 form a sideways V shape. The plate supplying guide 20 and the plate discharging guide 22 rotate by predetermined angles around a vicinity of the center in FIG. 1. Due to this rotation, the plate supplying guide 20 and the plate discharging guide 22 can selectively be made to correspond to the rotating drum 16 (i.e., can be disposed in a direction tangential to the rotating drum 16).

A hole forming device 24, which forms through-holes which serve as a reference for training the printing plate 12 around the plate cylinder of a rotary press (not illustrated), is disposed in a vicinity of the conveying guide unit 18. By making the plate supplying guide 20 oppose the hole forming device 24, the leading end of the printing plate 12 can be made to enter into the hole forming device 24. Namely, the printing plate 12 is first guided by the plate supplying guide 20 and fed into the hole forming device 24. After, for example, round holes or long holes have been formed in the leading end of the printing plate 12, the printing plate 12 is returned to the plate supplying guide 20. Thereafter, by rotating the conveying guide unit 18, the printing plate 12 is moved to a position corresponding to the rotating drum 16.

The rotating drum 16 is rotated by an unillustrated driving means in a direction in which the printing plate 12 is attached and exposed (the direction of arrow A in FIG. 1), and in a direction in which the printing plate 12 is removed (the direction of arrow B in FIG. 1) which is opposite to the attaching/exposing direction.

Leading end chucks 26 are mounted to predetermined positions of the outer peripheral surface of the rotating drum 16 provided in the exposure section 14. At the exposure section 14, when the printing plate 12 is to be attached to the rotating drum 16, first, the rotating drum 16 is stopped at a position (printing plate attaching position) at which the leading end chucks 26 oppose the leading end of the printing plate 12 which has been fed in by the plate supplying guide 20 of the conveying guide unit 18.

Attaching cams 28 are provided in the exposure section 14 so as to oppose the leading end chucks 26 at the printing plate attaching position. Due to the attaching cams 28 being rotated and one end sides of the leading end chucks 26 being pushed, the printing plate 12 can be inserted between the leading end chucks 26 and the peripheral surface of the rotating drum 16.

In the exposure section 14, in the state in which the leading end of the printing plate 12 is inserted between the leading end chucks 26 and the rotating drum 16, the attaching cams 28 are returned such that the pressing of the leading end chucks 26 is released. In this way, the leading end of the printing plate 12 is nipped and held between the leading end chucks 26 and the peripheral surface of the rotating drum 16.

At the exposure section 14, when the leading end of the printing plate 12 is fixed to the rotating drum 16, the rotating drum 16 is rotated in the attaching/exposing direction. In this way, the printing plate 12, which has been fed in from the plate supplying guide 20 of the conveying guide unit 18, is trained about the peripheral surface of the rotating drum 16.

A squeeze roller 30 is provided at the downstream side, in the attaching/exposing direction, of the printing plate attaching position, in a vicinity of the peripheral surface of the rotating drum 16. Due to the squeeze roller 30 moving toward the rotating drum 16, the printing plate 12 which is trained on the rotating drum 16 is pushed toward the rotating drum 16 and is made to fit tightly to the peripheral surface of the rotating drum 16.

Further, a trailing end chuck attaching/removing unit 32 is disposed in the exposure section 14 in a vicinity of the downstream side of the squeeze roller 30 in the attaching/exposing direction of the rotating drum 16. At the trailing end chuck attaching/removing unit 32, trailing end chucks 36 are mounted to the distal ends of shafts 34 which project toward the rotating drum 16.

In the exposure section 14, when the trailing end of the printing plate 12 which is trained on the rotating drum 16 opposes the trailing end chuck attaching/removing unit 32, the shafts 34 are extended such that the trailing end chucks 36 are attached to predetermined positions of the rotating drum 16. In this way, the trailing end of the printing plate 12 is nipped and held between the trailing end chucks 36 and the rotating drum 16.

In the exposure section 14, when the leading end and the trailing end of the printing plate 12 are held at the rotating drum 16, the squeeze roller 30 is moved away. Thereafter, in the exposure section 14, while rotating the rotating drum 16 at high speed at a predetermined rotational speed, a light beam, which is modulated on the basis of image data, is irradiated from a recording head portion 37 synchronously with the rotation of the rotating drum 16. In this way, the printing plate 12 is scan-exposed on the basis of the image data.

In the exposure section 14, when the scan-exposure of the printing plate 12 has been completed, the rotating drum 16 is temporarily stopped at a position at which the trailing end chucks 36, which are holding the trailing end of the printing plate 12, oppose the trailing end chuck attaching/removing unit 32. The trailing end chuck attaching/removing unit 32 removes the trailing end chucks 36 from the rotating drum 16. In this way, the trailing end of the printing plate 12 is freed.

Thereafter, by rotating the rotating drum 16 in the direction of removing the printing plate 12, the printing plate 12 is expelled, from the trailing end side thereof, to the plate discharging guide 22 of the conveying guide unit 18 along a direction tangential to the rotating drum 16. Thereafter, the printing plate 12 is conveyed to the developing device which is the subsequent process.

Here, the structure of the rotating drum 16, which is applied to the exposure section 14 of the automatic printing plate exposure device 10 having the above-described structure, will be described. Note that the diameter of the rotating drum 16 in the present embodiment is substantially 330 mm, and the axial direction length thereof is about 1200 mm.

Figure 2:
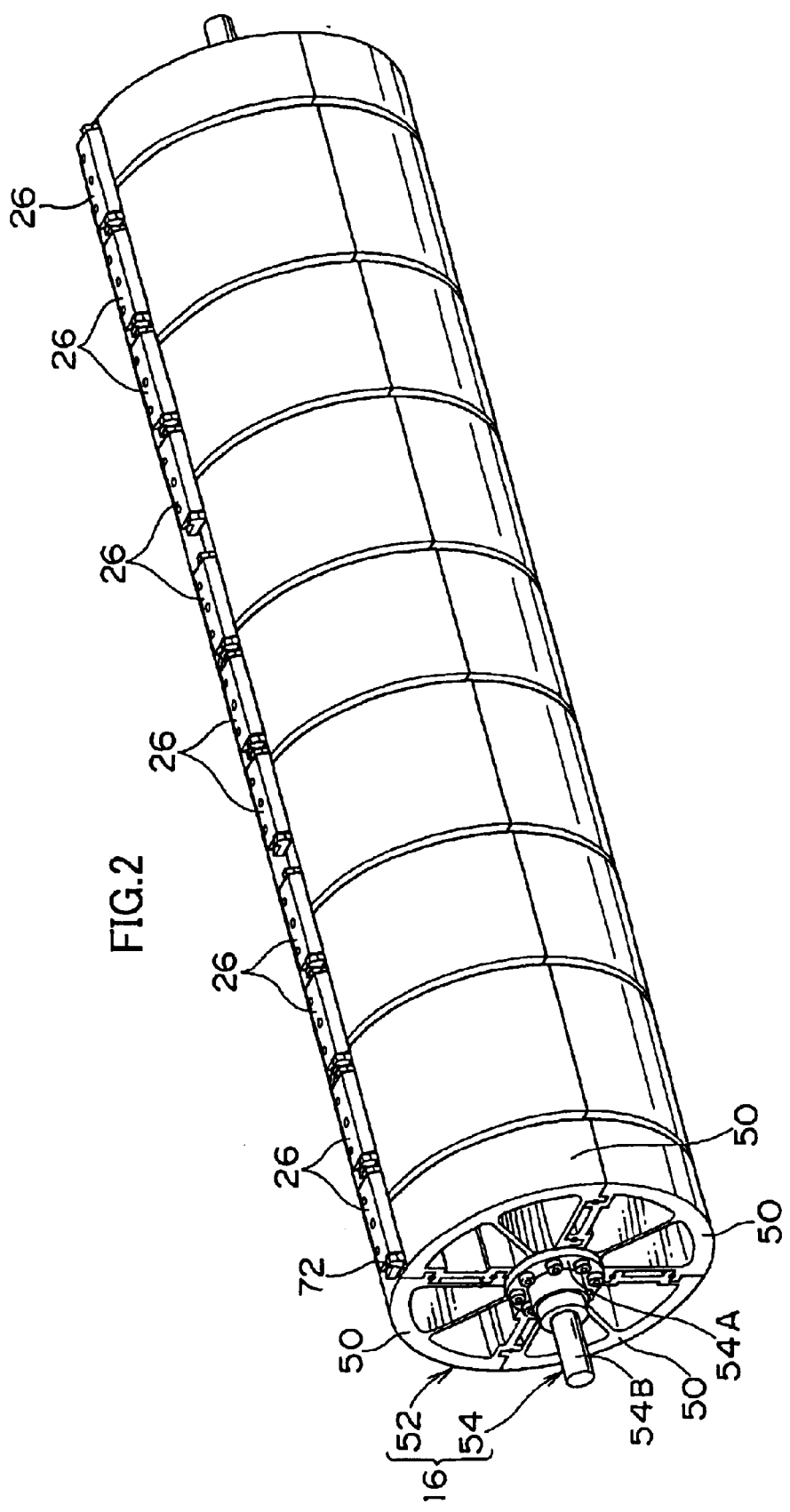
FIG. 2 is a perspective view of a rotating drum relating to the embodiment.
Figure 3:
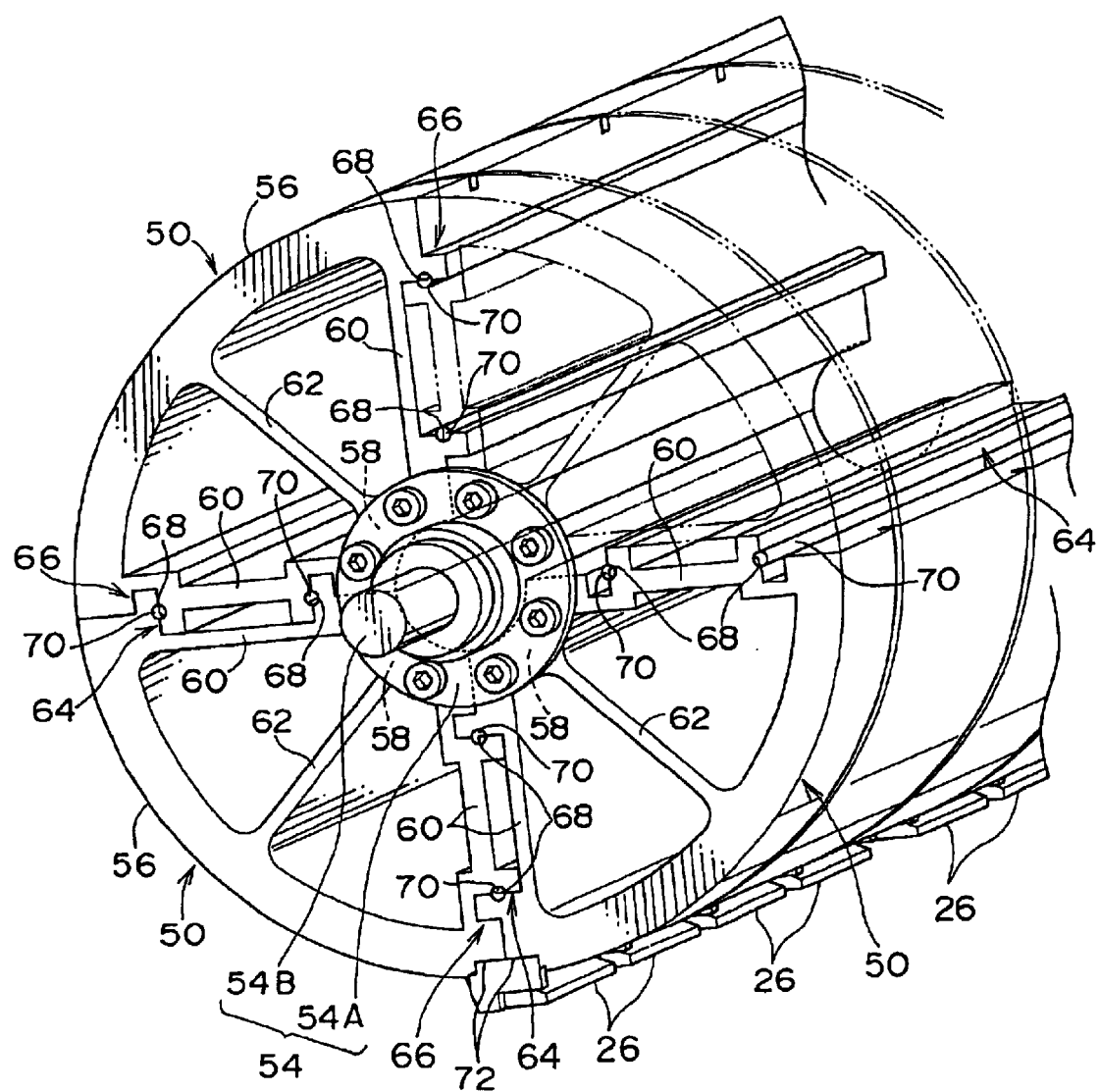
FIG. 3 is a perspective view showing a state in which the rotating drum relating to the embodiment is being assembled by drum parts.

As shown in FIGS. 2 and 3, the rotating drum 16 is structured by a drum main body 52 and a pair of rotating shaft units 54 being assembled together. The drum main body 52 is structured by four drum parts 50. The pair of rotating shaft units 54 are fixed to the end surfaces of the drum main body 52. The four drum parts 50 have substantially the same configurations. Thus, first, the structure of the common portions thereof will be described by using one drum part 50 as an example.

As shown in FIG. 3, as seen from the end surface side of the drum main body 52, the drum part 50 is one part of the four divisional parts obtained by dividing the drum main body 52 by two planes which contain the axial center of the drum main body 52 and which are orthogonal to one another. Each of the drum parts 50 has an outer arc portion 56 which forms the peripheral surface of the drum main body 52 around which the printing plate 12 is wound. Each drum part 50 is shaped as a tube (a hollow column) whose cross-section in the direction orthogonal to the axis is fan-shaped.

An inner arc portion 58, which is concentric with the outer arc portion 56, is formed at the central axis side of the drum part 50. The respective end portions of the inner arc portion 58 and the outer arc portion 56 are joined by rectilinear outer wall plate portions 60. The central portion of the outer periphery of the inner arc portion 58 and the central portion of the inner periphery of the outer arc portion 56 are joined by a reinforcing plate portion 62. The outer arc portion 56, the inner arc portion 58, the outer wall plate portions 60, and the reinforcing plate portion 62 are integrally molded by a molding device (not shown). At this time, the outer arc portion 56, the inner arc portion 58, the outer wall plate portions 60 and the reinforcing plate portion 62 are all formed to have the same configurations in the axial direction.

Figure 4:
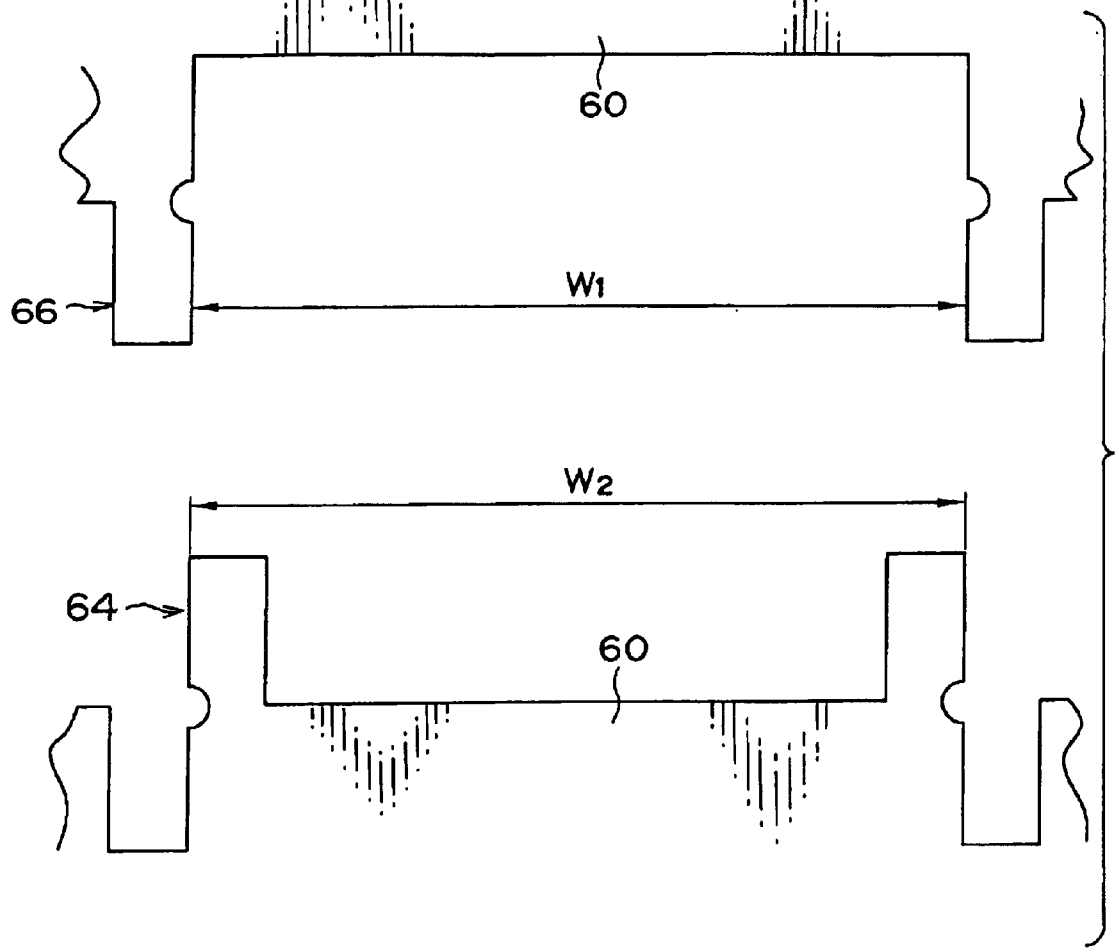
FIG. 4 is an enlarged view showing the relationship of the dimensions of male projecting portions and female projecting portions which form fit-together surfaces of the drum parts.

The outwardly-facing surfaces of the outer wall plate portions 60 are formed to have respectively different configurations. When the drum parts 50 are fit together, these different configurations are fit together. Namely, as shown in FIG. 4, a pair of female projecting portions 66, whose internal pitch dimension is $W_1$, are formed at one of the outer wall plate portions 60, and a pair of male projecting portions 64, whose external pitch dimension is $W_2$, are formed at the other of the outer wall plate portions 60.

The internal pitch dimension $W_1$ and the external pitch dimension $W_2$ have a predetermined fit-together tolerance. At the time of movement when the outer wall plate portions 60 of a pair of the drum parts 50 are being fit together, the male projecting portions 64 enter in at the inner sides of the female projecting portions 66. At this time, the inner side surfaces of the female projecting portions 66 and the outer side surfaces of the male projecting portions 64 are surfaces which slide against each other, and the relative positional relationship between the pair of drum parts 50 is determined thereby.

A semicircular cut-out groove 68 is formed in each of the inner side surfaces of the female projecting portions 66 and the outer side surfaces of the male projecting portions 64, i.e., in each of the sliding surfaces. The cut-out groove 68 is continuous between the both axial direction end surfaces. By making the outer wall plate portions 60 fit together, a space having a circular cross-section in the direction orthogonal to the axis is formed.

Here, at the time of assembling the four drum parts 50 together, when the first and the second drum parts 50 are assembled together, and then when the third drum part 50 is assembled thereto, the female projecting portions 66 and the male projecting portions 64 can be fit together, without any limitations on the movement at the time of making the drum parts 50 fit together. However, when the final fourth drum part 50 is assembled, the outer wall plate portions 60 must fit together at two places simultaneously. Namely, the third and the fourth drum parts 50 must be fit together, and the fourth and the first (initial) drum parts 50 must be fit together.

In this case, the sliding direction of the sliding surfaces of the female projecting portions 66 and the male projecting portions 64 at the time of making the fourth drum part 50 fit with one drum part 50 (one of the third and first drum parts 50), and the sliding direction of the sliding surfaces of the female projecting portions 66 and the male projecting portions 64 at the time of making the fourth drum part 50 fit with the other drum part 50 (the other of the third and first drum parts 50), are orthogonal to one another. Thus, these respective fit-together operations impede one another.

Here, by assembling at least the final drum part 50 by sliding at least this final drum part 50 in from the axial direction, it is possible to make the outer wall plate portions 60 thereof fit together at two places, i.e., fit together with the outer wall plate portions 60 of two of the other drum parts 50. After the four drum parts 50 have been assembled together, at each drum part 50, there is a fitting together of the female projecting portions 66 and the male projecting portions 64 at two places, and this assembled state is maintained.

In this state, wires 70 are press-fit into the cut-out grooves 68 (which have become round by having been made to oppose one another), from one end surface of the rotating drum 16. By press-fitting these wires 70 in, the four drum parts 50 are tightly assembled together, and an assembled state which is free of joggling is maintained. Note that the wires 70 are steel wires such as stainless steel wires or the like, and the diameter of each wire 70 is 6 mm.

Here, cut-out portions 72 for attachment of the leading end chucks 26 are formed at ones of peripheral direction end portions of the outer arc portions 56 of two adjacent drum parts 50 of the four drum parts 50 which are substantially the same. After the four drum parts 50 have been assembled together, the leading end chucks 26 are fixed to the cut-out portions 72.

By assembling the outer arc portions 56 together, the circumference around which the printing plate 12 is trained is formed, and the inner arc portions 58 also become a continuous circle.

Circular-plate-shaped flanges 54A, which are formed at the rotating shaft units 54, are fixed by bolts to the inner arc portions 58. In this way, rotating shafts 54B are provided at the assembled drum main body 52, and the rotating drum 16 is completed.

The rotating drum 16 which is a completed structure has point symmetry. Therefore, the imbalance at the time of rotation is relatively small. By making the imbalance small, the deadweight which is provided to adjust the balance can be made small.

Operation of the present embodiment will be described hereinafter.

First, the printing plate 12 is set on the plate supplying guide 20. At this time, the printing plate 12 may be fed-in by manual feeding, or by an unillustrated automatic printing plate separating/feeding device or the like.

The printing plate 12 on the plate supplying guide 20 is fed to the rotating drum 16, and the leading end portion of the printing plate 12 is held by the leading end chucks 26. By rotating the rotating drum 12 in this state, the printing plate 12 is trained tightly on the peripheral surface of the rotating drum 16. Thereafter, due to the trailing end of the printing plate 12 being held by the trailing end chucks 36, preparations for exposure are completed.

In this state, image data is read, and exposure processing is started by the light beam from the recording head portion 37. The exposure processing is so-called scan-exposure in which the recording head portion 37 is moved in the axial direction of the rotating drum 16 while the rotating drum 16 is rotated at high speed (main scanning).

When the exposure processing is completed, the conveying guide unit 18 is switched (the plate discharging guide 22 is made to correspond to the rotating drum 16). Then, the printing plate 12 trained on the rotating drum 16 is discharged from a direction tangential to the rotating drum 16. At this time, the printing plate 12 is fed to the plate discharging guide 22.

When the printing plate 12 is fed to the plate discharging guide 22, the conveying guide unit 18 is switched such that the plate discharging guide 22 is made to correspond to the discharge opening, and the printing plate 12 is discharged out. The developing section is provided in the direction of discharging, and the printing plate 12 is then subjected to developing processing.

Here, the rotating drum 16 of the present embodiment is not molded integrally, and is structured by assembling the drum main body 52 formed by the four drum parts 50, and the rotating shaft units 54 attached to the both end surfaces of the drum main body 52.

The assembly processes will be descried hereinafter.

Figure 5A:
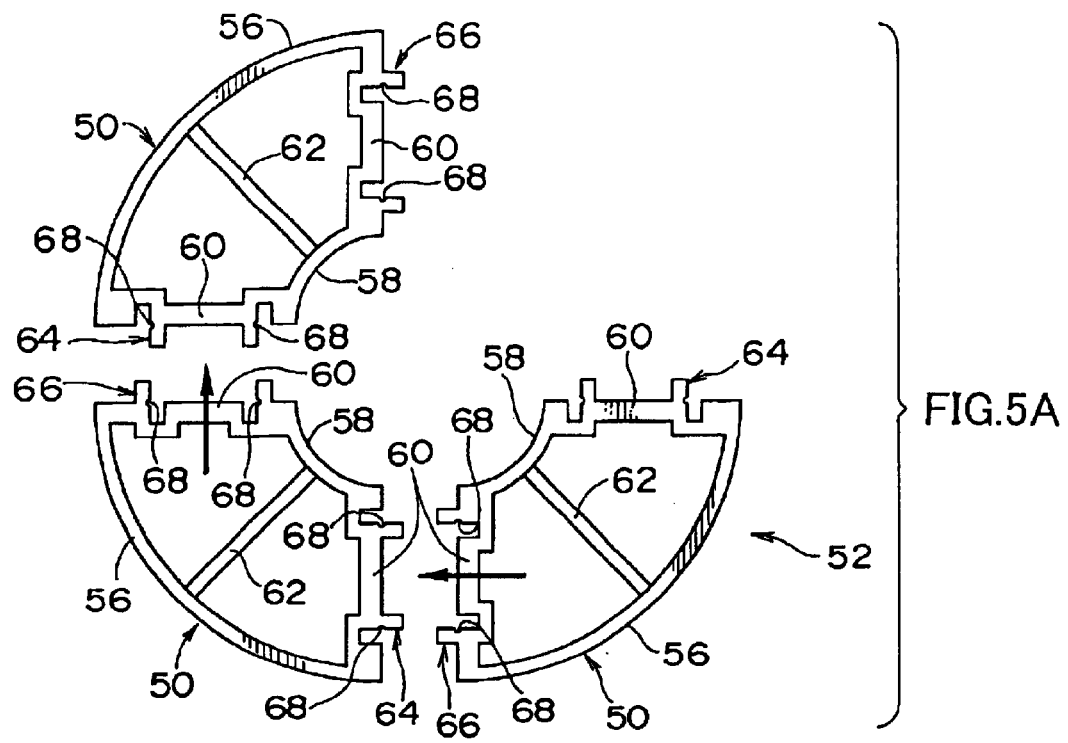
FIGS. 5A and 5B are front views as seen from an axial direction and are for explaining a process of assembling the drum parts, where

First, as shown in FIG. 5A, the first and second drum parts 50 are assembled together. In this case, the outer wall plate portions 60 which are made to fit together with one another are only at one place (one outer wall plate portion 60 at which the female projecting portions 66 are formed, and another outer wall plate portion 60 at which the male projecting portions 64 are formed). Thus, assembly of the first and second drum parts 50 is easily completed by moving the second drum part 50 as is in the direction in which the second drum part 50 is made to fit together with the first drum part 50.

Here, the inner dimension $W_1$ of the female projecting portions 66 and the outer dimension $W_2$ of the male projecting portions 64 are such that there is a fit-together tolerance between the two dimensions. Thus, the first and second drum parts 50 are made to fit together while the inner side surfaces of the female projecting portions 66 and the outer side surfaces of the male projecting portions 64 slide along one another.

Next, the third drum part 50 is assembled to the assembled structure of the first and second drum parts 50. In this case as well, the outer wall plate portions 60 which are being made to fit together exist only at one place (one outer wall plate portion 60 at which the female projecting portions 66 are formed, and another outer wall plate portion 60 at which the male projecting portions 64 are formed). Thus, this assembly is easily completed by moving the third drum part 50 as is in the direction in which the third drum part 50 is made to fit together with the second drum part 50.

Figure 5B:
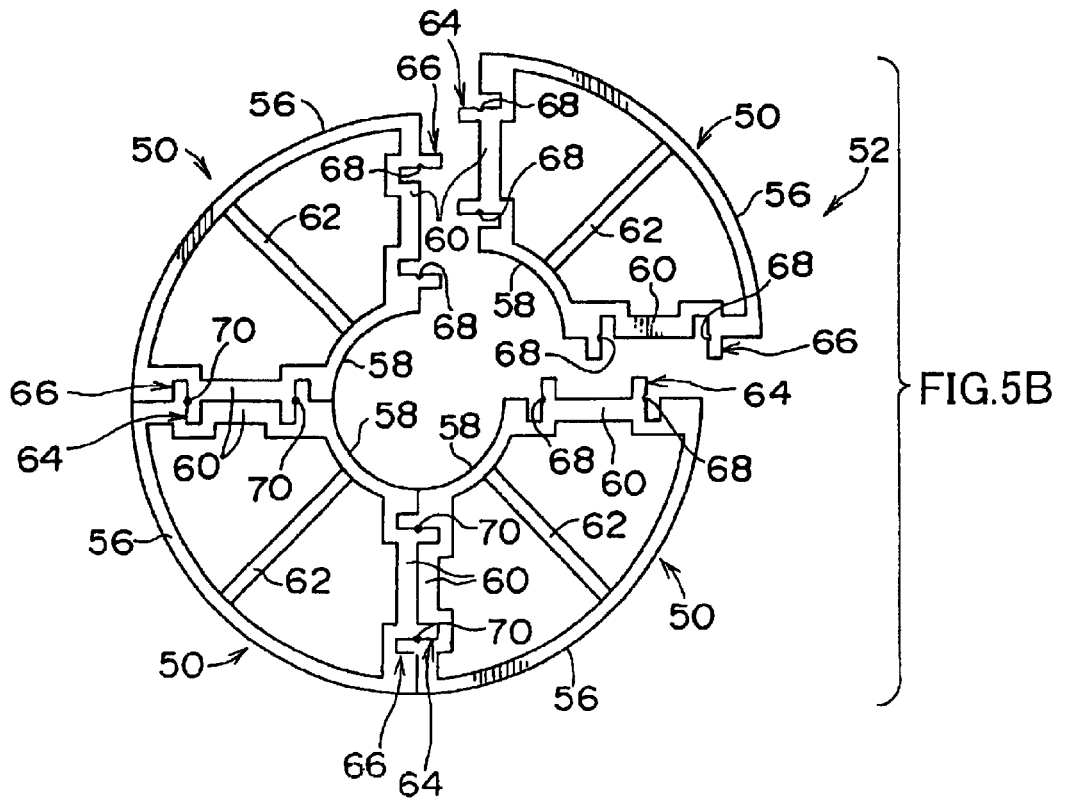

Next, the fourth drum part 50 is assembled to the assembled structure of the three drum parts 50. In this case, there simultaneously exist fit-together surfaces at two places. Namely, the two outer wall plate portions 60 of the fourth drum part 50 must simultaneously be made to fit together with the outer wall plate portion 60 of the third drum part 50 and the outer wall plate portion 60 of the first (initial) drum part 50 which have been assembled in accordance with the above-described processes (see FIG. 5B).

However, the sliding direction of the female projecting portions 66 and the male projecting portions 64 at one side, and the sliding direction of the female projecting portions 66 and the male projecting portions 64 at the other side, are orthogonal to one another. Thus, these respective fitting-together movements hinder one another.

Figure 6:
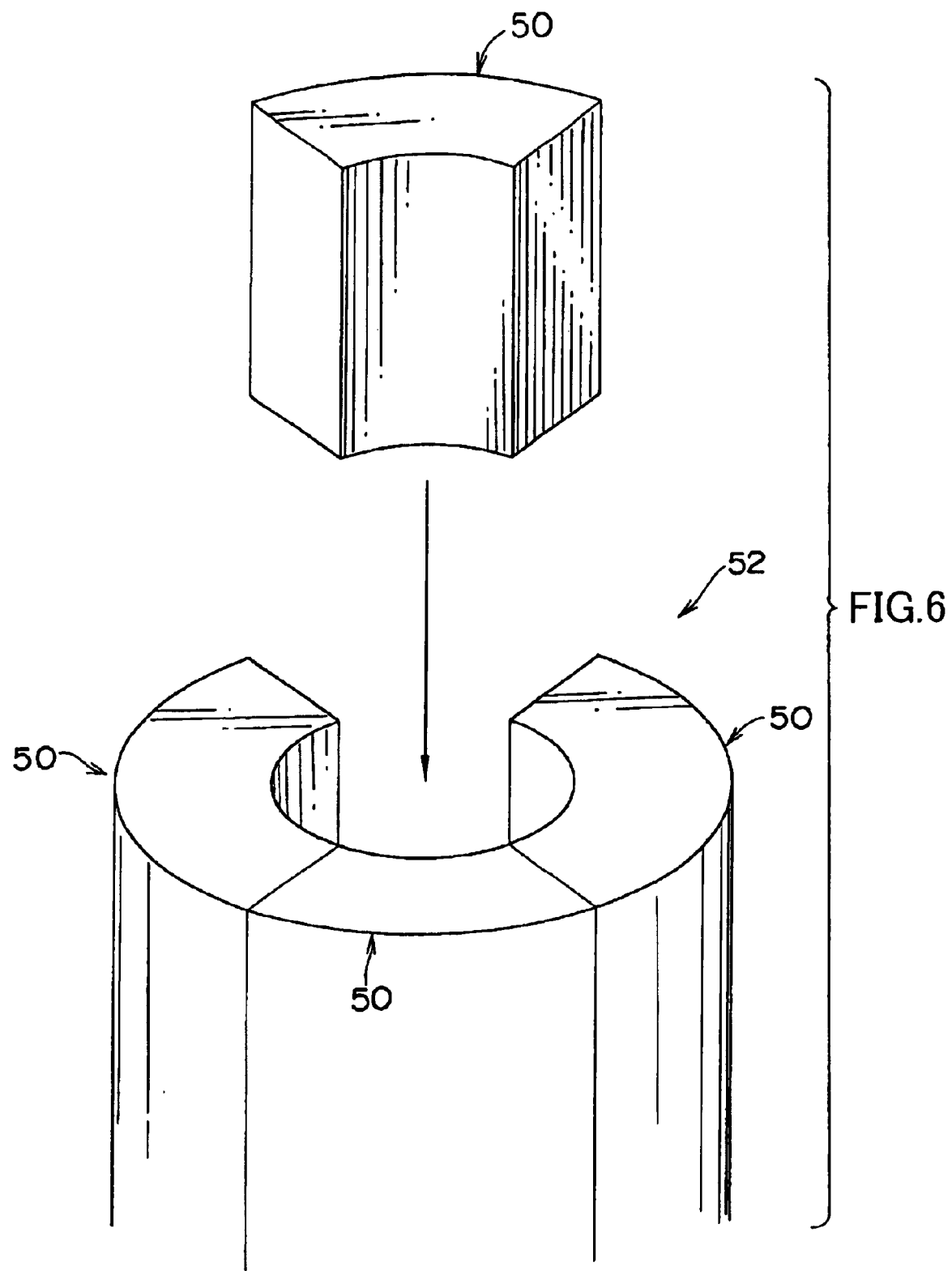
FIG. 6 is a perspective view of a drum main body at the time when the fourth drum part is being assembled.

Thus, here, the fourth (and final) drum part 50 is inserted from an axial direction end surface side in a state of being offset in the axial direction with respect to the assembled structure of the three drum parts 50 (see FIG. 6). In this way, the pair of outer wall plate portions 60 at the two places can simultaneously be made to fit together with the adjacent drum parts 50, and the assembly of the four drum parts 50 is completed.

When assembly of the four drum parts 50 (i.e., all of the drum parts 50) has been completed, movement, in the sliding direction, of the female projecting portions 66 and the male projecting portions 64 at one place, and movement, in the sliding direction, of the female projecting portions 66 and the male projecting portions 64 at the other place (which sliding directions are orthogonal to one another), are impeded. Therefore, the assembled state is maintained.

In this state, at the regions where the four outer wall plate portions 60 fit together with one another, the cut-out grooves 68 oppose one another and form round holes. The wires 70 are press-fit into these round holes. In this way, there is no joggling between the drum parts 50, and the assembly of the drum main body 52 is completed in a state in which the outer arc portions 56 form a substantially completely round configuration.

After the drum main body 52 has been assembled, by fastening the flange portions 54A of the rotating shaft units 54 to the inner arc portions 58 by bolts, the rotating shafts 54B are attached to the axial center, and the rotating drum 16 is completed.

In accordance with the rotating drum 16 having the above-described structure, the rotating drum 16 can be molded by using dies of a molding machine whose outer diameter dimension (corresponding to the dimension of the arc connecting the both ends of the outer arc portion 56 of the drum part 50) is smaller than the diameter of the rotating drum 16. Thus, the rotating drum 16 which can handle large-sized printing plates can be manufactured by using a relatively small molding machine. In particular, by dividing the rotating drum 16 into four parts, the molding machine can efficiently be made compact.

Further, the joining together of the drum parts 50 is carried out by fitting the female projecting portions 66 and the male projecting portions 64 together. By press-fitting the wires 70 in after assembly, joggling is prevented. Thus, during the assembly operation, the work efficiently can be improved by permitting the amount of joggling needed for assembly. After assembly has been completed by press-fitting the wires 70 in, the four drum parts 50 can be held tightly. Therefore, the peripheral surface, which is formed by the outer arc portions 56 and around which the printing plate 12 is trained, can be maintained in a completely round state.

The configurations of the drum parts 50 have point symmetry when the drum main body 52 is assembled. Therefore, the imbalance of the rotating drum 16 can be made small. Because the imbalance is small, the deadweight for adjusting the balance can be made small, and there is no great increase in the weight of the rotating drum 16.

In the present embodiment, the female projecting portions 66 and the male projecting portions 64 are formed on different levels in the radial direction, and form sliding surfaces such that the male projecting portions 64 are inserted at the inner sides of the female projecting portions 66. However, the configurations thereof are not limited to these configurations, and it suffices that the male projecting portions 64 and the female projecting portions 66 are formed as convex portions and concave portions. Namely, there is no need to hollow out the inner sides of the male projecting portions 64 shown in FIG. 4. Further, it suffices to not provide projections at the both ends of the female projecting portions 66, and rather, to merely form a recess.

In the present embodiment, after the drum parts 50 have been assembled, rattling of the drum parts 50 is eliminated by using the wires 70 which are separate members. However, depending on the dimensional accuracy, the wires 70 may be unnecessary, and it may suffice to press-fit the male projecting portions 64 into the female projecting portions 66.

Figure 7:
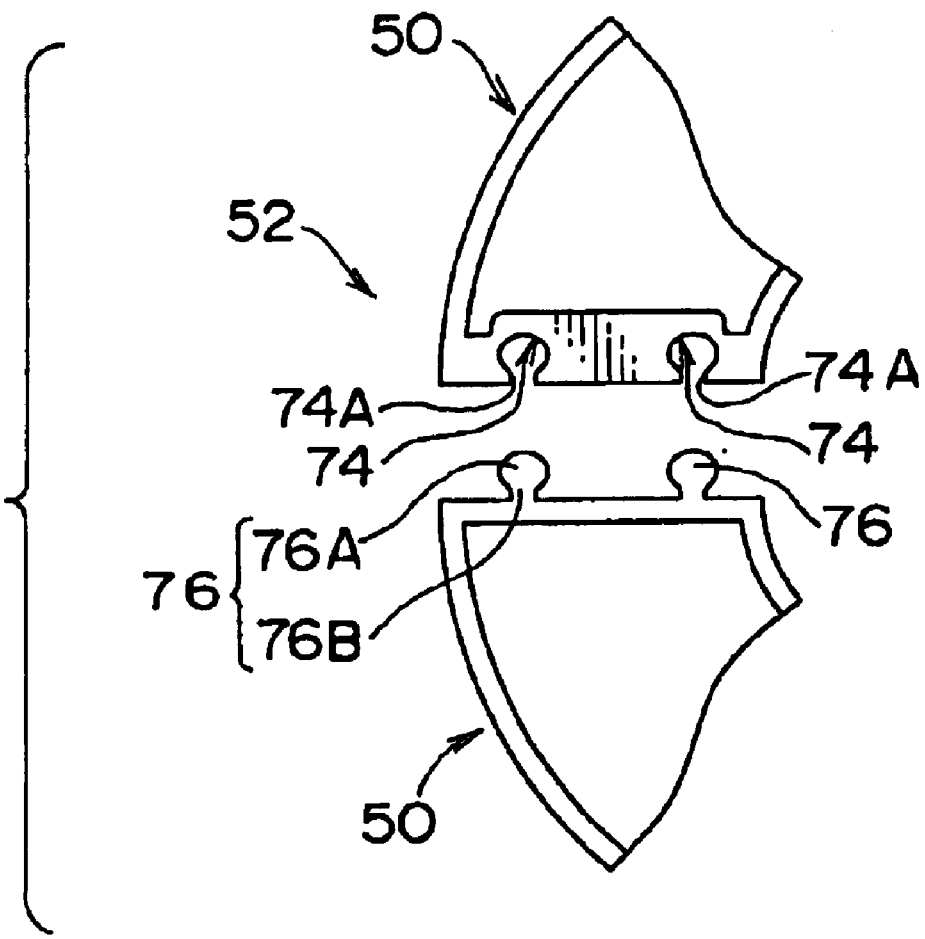
FIG. 7 is a front view as seen from the axial direction, and shows the fit-together surfaces of drum parts relating to a first modified example.

In the above description, only the final drum part 50 was inserted in from the end surface side of the drum main body 52. However, all of the drum parts 50 may be assembled by being inserted in from one end surface side. In this case, as shown in FIG. 7, concave portions 74 and convex portions 76 may be provided at the fit-together surfaces. The dimensions of the openings of opening portions 74A of the concave portions 74 become more narrow toward the depth thereof, and head portions 76A of the convex portions 76 are made more wide than base portions (neck portions) 76B. In this way, the concave portions 74 and convex portions 76 serve as stoppers for stopping movement in the fit-together directions, and are press-fit into each other. (This is the first modified example.)

Figure 8:
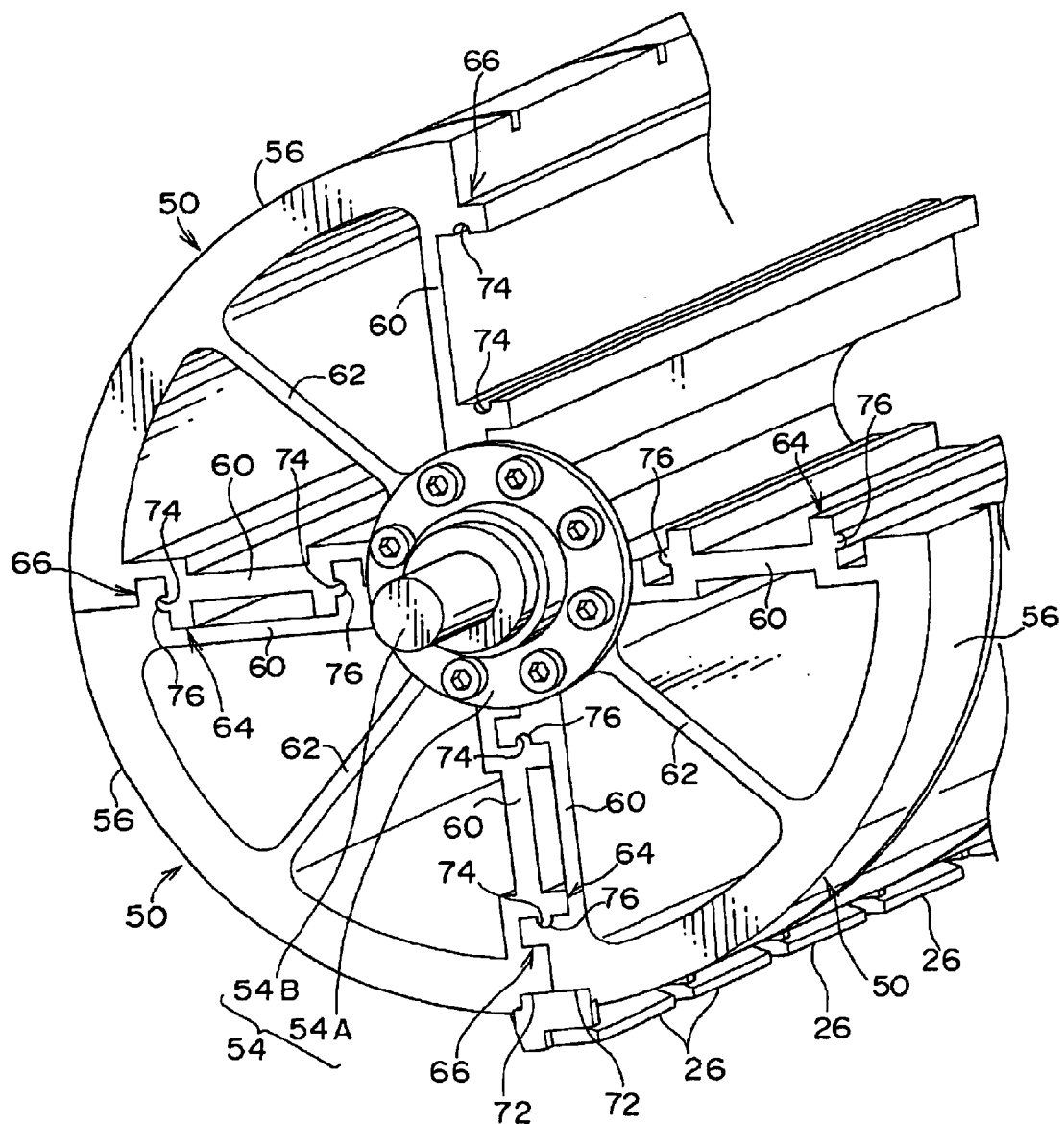
FIG. 8 is a front view as seen from the axial direction, and shows the fit-together surfaces of drum parts relating to a second modified example.

Further, as shown in FIG. 8, the concave portions 74 and convex portions 76 may be provided at the sliding surfaces of the female projecting portions 66 and the male projecting portions 64. (This is the second modified example.)

Further, in the first and second modified examples, if the convex portions 76 and/or the concave portions 74 are made to be elastically deformable, assembly from the fit-together directions is possible.

As described above, in the present embodiment, the drum main body 52 is divided into the four drum parts 50 whose cross-sectional configurations in the direction orthogonal to the axis are fan-shaped. The female projecting portions 66 and the male projecting portions 64 are provided at the fit-together surfaces of the drum parts 50 which are adjacent to one another in the assembled state, such that the female projecting portions 66 and the male projecting portions 64 oppose one another. The female projecting portions 66 and the male projecting portions 64 form sliding surfaces at the time the drum parts 50 are moved in directions of fitting together with one another. The female projecting portions 66 and the male projecting portions 64 are formed as projecting portions having pitch dimensions which have a predetermined fit-together tolerance. Thus, the drum parts 50 can be assembled together with there being some leeway at the time of assembly. The semicircular cut-out grooves 68 are formed in the sliding surfaces, and form circles when the drum parts 50 are made to fit together. After the four drum parts 50 have been assembled together, the wires 70 are press-fit therein from an end surface side of the drum main body 52. In this way, the drum parts 50 are tightly fit together, and the completely round state of the outer arc portions 56 can be maintained.

The assembled drum main body 52 defines the configuration of the drum parts 50 such that the drum parts 50 have point symmetry. Therefore, the imbalance can be made to be small.

Moreover, dividing the drum main body 52 into four parts eliminates the need to increase the size of the dies of a molding machine when the diameter of the rotating drum 16 is enlarged when the size of the printing plate 12 increases. Thus, the molding machine can be made to be more compact, and the work efficiency improves. The more the number of divisional parts of the drum main body 52, the more it is possible to prevent the molding machine from becoming larger. However, it is preferable to divide the drum main body 52 into four parts in consideration of the intrinsic characteristics of the rotating drum 16, such as the completely round state of the outer circumference, durability, and the like.

As described above, the present invention achieves the excellent effects that, when the rotating drum is rotated at high speed, offset between divisional drum parts is eliminated, there is little imbalance, and the moment of inertia for rotation is small.

Moreover, in addition to the above effects, by dividing the rotating drum into at least three parts and preferably four or more parts, the diameter of the completed rotating drum can be made to be larger than the maximum diameter of dies of an extrusion molding device used in manufacturing the rotating drum.

What is claimed is:

1. A drum rotatable around a drum axis, and having a drum main body on whose outer peripheral surface a sheet is wound and held, said drum comprising:

(a) a plurality of drum parts which are structured so as to divide the drum main body into plural parts in a peripheral direction, and which form the drum main body by being assembled together, and which can be separated from one another; and (b) joining elements which, at a time of assembling said drum, are positioned at borders of the drum parts which are adjacent, and which respectively extend parallel to the drum axis, and which are for joining the drum parts such that the drum parts can be separated from one another, wherein a plurality of joining elements exist at one border, at least two of which are separated and oppose one another.

2. The drum of claim 1, wherein the drum is for an image recording device.

3. The drum of claim 1, wherein the drum parts are positioned so as to substantially have point symmetry with respect to the drum axis.

4. The drum of claim 1, wherein cross-sectional configurations of the drum parts in a cross-section traversing the drum axis are substantially fan-shaped, and are substantially the same configurations.

5. The drum of claim 1, wherein the drum main body has at least three drum parts.

6. The drum of claim 1, wherein one drum part can be separated from the drum main body by being moved along a direction parallel to the drum axis.

7. The drum of claim 1, wherein the joining elements include a concave portion at one drum part, a corresponding concave portion at an adjacent one drum part, and a bar which can simultaneously be fit into both concave portions.

8. The drum of claim 7, wherein, at the time of assembling the drum, the both concave portions oppose one another and extend parallel to an axial direction of the drum.

9. The drum of claim 1, wherein the joining elements have a concave portion at one drum part, and a corresponding convex portion at an adjacent one drum part.

10. The drum of claim 9, wherein the concave portion and the corresponding convex portion are dovetailed.

11. An image recording device for forming an image on a printing plate, said image recording device comprising:
(I) a drum rotatable around a drum axis, and having a drum main body on whose outer peripheral surface a printing plate is wound and held, the drum having:
(a) a plurality of drum parts which are structured so as to divide the drum main body into plural parts in a peripheral direction, and which form the drum main body by being assembled together, and which can be separated from one another; and
(b) joining elements which, at a time of assembling the drum, are positioned at borders of the drum parts which are adjacent, and which respectively extend parallel to the drum axis, and which are for joining the drum parts such that the drum parts can be separated from one another; and
wherein a plurality of joining elements exist at one border, at least two of which are separated and oppose one another, and
(II) a recording head portion disposed so as to oppose the outer peripheral surface of the drum, and having a recording head for recording an image on the printing plate.

12. The image recording device of claim 11, wherein image recording is carried out by the recording head, with main scanning being carried out by the drum being rotated and with subscanning being carried out by the recording head being moved.

13. The image recording device of claim 11, further comprising a conveying unit supplying the printing plate to the drum.

14. The image recording device of claim 12, further comprising a plurality of chucks for fixing the printing plate which is wound on the outer peripheral surface of the drum.

15. An image recording device for forming an image on a printing plate, said image recording device comprising:
(I) a drum rotatable around a drum axis, and having a drum main body on whose outer peripheral surface a printing plate is wound and held, the drum having:
(a) a plurality of drum parts which are structured so as to divide the drum main body into plural parts in a peripheral direction, and which form the drum main body by being assembled together, and which can be separated from one another wherein each drum part includes at least one reinforcing plate portion extending radially outward to the drum outer peripheral surface; and
(b) joining elements which, at the time of assembling the drum, are positioned at borders of the drum parts which are adjacent, and which respectively extend parallel to the drum axis, and which are for joining the drum parts such that the drum parts can be separated from one another, and
(II) a recording head portion disposed so as to oppose the outer peripheral surface of the drum, and having a recording head for recording an image on the printing plate.

16. The image recording device of claim 15, wherein image recording is carried out by the recording head, with main scanning being carried out by the drum being rotated and with subscanning being carried out by the recording head being moved.

17. The image recording device of claim 15, further comprising a conveying unit supplying the printing plate to the drum.

18. The image recording device of claim 15, further comprising a plurality of chucks for fixing the printing plate which is wound on the outer peripheral surface of the drum.

19. The image recording device of claim 15, wherein the drum parts are positioned to have substantial point symmetry with respect to the drum axis.

20. The image recording device of claim 15, wherein cross-sectional configurations of the drum parts in a cross-section traversing the drum axis are substantially fan-shaped and are substantially the same configurations.

21. The image recording device of claim 15, wherein one drum part can be separated from the drum main body by being moved along a direction parallel to the drum axis.

22. The image recording device of claim 15 wherein a plurality of joining elements exist at one border.

23. The image recording device of claim 22 wherein the joining elements include a concave portion at one drum part, a corresponding concave portion at an adjacent drum part, and a bar which can simultaneously be fit into both concave portions.

24. The image recording device of claim 23 wherein, at the time of assembling the drum, both concave portions oppose one another and extend parallel to an axial direction of the drum.

25. The image recording device of claim 22 wherein the joining elements have a concave portion at one drum part, and a corresponding convex portion at an adjacent drum part.

26. The image recording device of claim 25 wherein the concave portion and the corresponding convex portion are dovetailed.

* * * * *